US009041864B2

(12) United States Patent
Nenonen

(10) Patent No.: US 9,041,864 B2
(45) Date of Patent: May 26, 2015

(54) METHOD AND APPARATUS FOR TEMPORAL STABILIZATION OF STREAMING FRAMES

(71) Applicant: Nokia Technologies Oy, Espoo (FI)

(72) Inventor: Petri Nenonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/063,575

(22) Filed: Oct. 25, 2013

(65) Prior Publication Data
US 2014/0139745 A1 May 22, 2014

Related U.S. Application Data

(60) Provisional application No. 61/727,946, filed on Nov. 19, 2012.

(51) Int. Cl.
H04N 9/73 (2006.01)
H04N 5/20 (2006.01)
H04N 5/235 (2006.01)
H04N 5/243 (2006.01)

(52) U.S. Cl.
CPC . *H04N 9/73* (2013.01); *H04N 5/20* (2013.01); *H04N 5/2353* (2013.01); *H04N 5/243* (2013.01)

(58) Field of Classification Search
USPC .............. 348/607, 611, 614, 624, 630, 448; 382/260, 254, 266; 375/240.24, 375/240.26, 240.29
See application file for complete search history.

(56) References Cited

U.S. PATENT DOCUMENTS

| 5,449,907 | A | * | 9/1995 | McKeeman et al. | 250/332 |
| 6,148,103 | A | | 11/2000 | Nenonen | |
| 6,335,990 | B1 | * | 1/2002 | Chen et al. | 382/261 |
| 7,720,306 | B2 | * | 5/2010 | Gardiner et al. | 382/276 |
| 7,835,588 | B2 | | 11/2010 | Parkkinen et al. | |

(Continued)

FOREIGN PATENT DOCUMENTS

| EP | 0 856 813 A2 | 8/1998 |
| EP | 1 865 711 A2 | 12/2007 |

(Continued)

OTHER PUBLICATIONS

European Search Report for Application No. EP 13 19 1488 dated Apr. 2, 2014.

(Continued)

*Primary Examiner* — Paulos M Natnael
(74) *Attorney, Agent, or Firm* — Alston & Bird LLP

(57) ABSTRACT

A method, apparatus and computer program product are disclosed to provide improved temporal stabilization of a control algorithm associated with the processing of streaming frames. In the context of a method, the number of immediately preceding consecutive frames during which a filtered value has been greater than a current value of the current frame is determined or the number of immediately preceding, consecutive frames during which the filtered value has been less than the current value of the current frame is determined. The method also includes determining a weight based upon the number of immediately preceding, consecutive frames. The weight is configured to vary in a direct relationship to the number of immediately preceding, consecutive frames. The method also determines a filtered value of a current frame based upon a combination of the weight and the difference between the prior filtered value and the value of the current frame.

15 Claims, 7 Drawing Sheets

(56) References Cited

U.S. PATENT DOCUMENTS

| | | |
|---|---|---|
| 7,917,116 B2* | 3/2011 | Hoo et al. .................. 455/277.1 |
| 8,421,917 B2* | 4/2013 | Kobayashi ................... 348/448 |
| 8,611,468 B2* | 12/2013 | Di Grazia et al. ............. 375/324 |
| 2005/0186921 A1* | 8/2005 | Hoo et al. ...................... 455/121 |
| 2007/0053441 A1* | 3/2007 | Wang et al. .............. 375/240.24 |
| 2010/0265342 A1 | 10/2010 | Liang et al. |
| 2012/0257113 A1* | 10/2012 | Hsu et al. ...................... 348/607 |
| 2013/0188093 A1* | 7/2013 | Kobayashi ................... 348/448 |
| 2013/0251282 A1* | 9/2013 | Min .............................. 382/260 |

FOREIGN PATENT DOCUMENTS

| | | |
|---|---|---|
| EP | 1 919 209 A1 | 5/2008 |
| KR | 2007-0116743 A | 12/2007 |

OTHER PUBLICATIONS

Office Action from Korean Patent Application No. 2013-0140013, dated Feb. 17, 2015.

* cited by examiner

METHOD AND APPARATUS FOR TEMPORAL STABILIZATION OF STREAMING FRAMES

CROSS-REFERENCE TO RELATED APPLICATION

This application is a non-provisional of and claims priority to U.S. Provisional Application No. 61/727,946, filed on Nov. 19, 2012, the entire contents of which are hereby incorporated by reference.

TECHNOLOGICAL FIELD

A method and apparatus are provided in accordance with an example embodiment for processing streaming frames and, more particularly, for providing temporal stabilization of streaming frames.

BACKGROUND

In order to appropriately record or otherwise process streaming frames, such as by capturing streaming video frames, a number of control algorithms are implemented. For example, control algorithms for streaming frames include an automatic exposure control (AEC) algorithm, an automatic white balance (AWB) algorithm, a contrast optimization algorithm as described by U.S. Pat. No. 7,835,588 and the like. By way of example, the AEC algorithm receives information regarding the exposure and other image statistics relating to the current frame, determines whether the image represented by the current frame is underexposed, overexposed or properly exposed and, in an instance in which the image represented by the current frame is determined to be either underexposed or overexposed, suggests a different exposure for the next frame. In this regard, FIG. 1 depicts the illumination level of a plurality of frames with a solid line and, in turn, the exposure suggested by the AEC algorithm for the next frame with a dashed line. Because the analysis performed by the AEC algorithm is performed on a frame that has already been exposed, the illumination may change for the next frame. Since it is oftentimes desired that frames streaming experience no delay, there may be an occasional underexposure as represented by "u" in FIG. 1 or an occasional overexposure as represented by "o" in FIG. 1. Additionally, frequent changes in the exposure level, such as may be brought about from the analysis of the illumination level of the current frame, may generate repeated changes in the exposure level over the course of time in response to at least some relatively minor variations in image brightness such that the resulting visual effect may be somewhat unsettling for a viewer.

One technique has been developed that saves the unfiltered control values, that is, the product of one or more control algorithms, that have been determined for a number of prior frames and then determines and utilizes a weighted average of the control values. However, the convergence speed of this technique is not easily and accurately tunable. Additionally, the strength of the filtering provided by this technique may only be increased in an instance in which the number of samples that are saved is relatively high, which may also be disadvantageous.

BRIEF SUMMARY

A method, apparatus and computer program product are provided according to an example embodiment of the present invention in order to provide improved temporal stabilization of one or more control algorithms associated with the processing of streaming frames. In this regard, the method, apparatus and computer program product of an example embodiment respond to changes in exposure in a smooth, but pleasantly fast manner and may, in one embodiment, permit the convergence speed to be tunable. Additionally, the method, apparatus and computer program product of an example embodiment may be configured so as not to respond to occasional short outliers in the input data, such as a flashing light. Consequently, the method, apparatus and computer program product of an example embodiment may provide relatively stable control for the streaming video in instances in which the streaming frames have only minor variations. In one embodiment, the method, apparatus and computer program product may also smoothly follow a descending or ascending trend of the streaming frame. By providing temporal stabilization for the streaming frames, the user experience may be improved by providing the desired control, but in a manner that is pleasing and, in some instances, tunable by the user.

In one embodiment, a method is provided that includes determining, with a processor, a number of immediately preceding consecutive frames during which a filtered value has been greater than a current value of the current frame or the number of immediately preceding, consecutive frames during which the filtered value has been less than the current value of the current frame. The method of this embodiment may also include determining a weight based upon the number of immediately preceding, consecutive frames. The weight is configured to vary in a direct relationship to the number of immediately preceding, consecutive frames. The method of this embodiment also determines a filtered value of a current frame based upon a combination of the weight and the difference between the prior filtered value and the value of the current frame.

In one embodiment, the method determines the number of immediately preceding, consecutive frames by maintaining a first counter of the number of immediately preceding, consecutive frames during which the filtered value has been greater than the current value of the current frame or maintaining a second counter of the number of immediately preceding, consecutive frames during which the filtered value has been less than the current value of the current frame. The method of this embodiment may also include resetting at least one of the first and second counters in an instance in which the filtered value at least exceeds the current value of the current frame. The method of another embodiment may further include reducing at least one of the first and second counters in an instance in which the filtered value at least exceeds the current value of the current frame. In this embodiment, the method may also include determining that the immediately preceding, consecutive frames are ascending or determining that the immediately preceding, consecutive frames are descending. In this embodiment, the method may reduce at least one of the first and second counters by reducing, but not resetting, at least one of the first and second counters in an instance in which the immediately preceding, consecutive frames are determined to be ascending or to be descending.

In another embodiment, an apparatus is provided that includes at least one processor and at least one memory including computer program code with the at least one memory and the computer program code configured to, with the processor, cause the apparatus to at least determine a number of immediately preceding consecutive frames during which a filtered value has been greater than a current value of the current frame or the number of immediately preceding, consecutive frames during which the filtered value has been less than the current value of the current frame. The at least one memory and the computer program code are also configured to, with the processor, cause the apparatus of one embodiment to determine a weight based upon the number of immediately preceding, consecutive frames. The weight is configured to vary in a direct relationship to the number of immediately preceding, consecutive frames. The at least one memory and the computer program code are also configured to, with the processor, cause the apparatus of one embodiment to determine a filtered value of a current frame based upon a combination of the weight and the difference between the prior filtered value and the value of the current frame.

In one embodiment, the at least one memory and the computer program code are configured to, with the processor, cause the apparatus to determine the number of immediately preceding, consecutive frames by maintaining a first counter of the number of immediately preceding, consecutive frames during which the filtered value has been greater than the current value of the current frame or by maintaining a second counter of the number of immediately preceding, consecutive frames during which the filtered value has been less than the current value of the current frame. The at least one memory and the computer program code may also be configured to, with the processor, cause the apparatus of one embodiment to reset at least one of the first and second counters in an instance in which the filtered value at least exceeds the current value of the current frame. The at least one memory and the computer program code may be configured to, with the processor, cause the apparatus of an alternative embodiment to reduce at least one of the first and second counters in an instance in which the filtered value at least exceeds the current value of the current frame. In this embodiment, the at least one memory and the computer program code may also be configured to, with the processor, cause the apparatus to determine that the immediately preceding, consecutive frames are ascending or to determine that the immediately preceding, consecutive frames are descending. In this embodiment, the at least one memory and the computer program code may be configured to, with the processor, cause the apparatus to reduce at least one of the first and second counters by reducing, but not resetting, at least one of the first and second counters in an instance in which the immediately preceding, consecutive frames are determined to be ascending or to be descending.

In a further embodiment, a computer program product is provided that includes at least one non-transitory computer-readable storage medium having computer-executable program code portions stored therein with the computer-executable program code portions comprising program code instructions for determining a number of immediately preceding consecutive frames during which a filtered value has been greater than a current value of the current frame or the number of immediately preceding, consecutive frames during which the filtered value has been less than the current value of the current frame. The computer-executable program code portions of this embodiment also include program code instructions for determining a weight based upon the number of immediately preceding, consecutive frames. The weight is configured to vary in a direct relationship to the number of immediately preceding, consecutive frames. The computer-executable program code portions of this embodiment also include program code instructions for determining a filtered value of a current frame based upon a combination of the weight and the difference between the prior filtered value and the value of the current frame.

In one embodiment, the program code instructions for determining the number of immediately preceding, consecutive frames include program code instructions for maintaining a first counter of the number of immediately preceding, consecutive frames during which the filtered value has been greater than the current value of the current frame or program code instructions for maintaining a second counter of the number of immediately preceding, consecutive frames during which the filtered value has been less than the current value of the current frame. The computer-executable program code portions of a further embodiment may also include program code instructions for resetting at least one of the first and second counters in an instance in which the filtered value at least exceeds the current value of the current frame. The computer-executable program code portions of another embodiment may also include program code instructions for reducing at least one of the first and second counters in an instance in which the filtered value at least exceeds the current value of the current frame. In this embodiment, the computer-executable program code portions may also include program code instructions for determining that the immediately preceding, consecutive frames are ascending or determining that the immediately preceding, consecutive frames are descending. In this embodiment, the computer-executable program code portions may also include program code instructions for reducing at least one of the first and second counters by reducing, but not resetting, at least one of the first and second counters in an instance in which the immediately preceding, consecutive frames are determined to be ascending or to be descending.

In yet another embodiment, an apparatus is provided that includes means for determining a number of immediately preceding consecutive frames during which a filtered value has been greater than a current value of the current frame or the number of immediately preceding, consecutive frames during which the filtered value has been less than the current value of the current frame. The apparatus of this embodiment may also include means for determining a weight based upon the number of immediately preceding, consecutive frames. The weight is configured to vary in a direct relationship to the number of immediately preceding, consecutive frames. The apparatus of this embodiment also includes means for determining a filtered value of a current frame based upon a combination of the weight and the difference between the prior filtered value and the value of the current frame.

BRIEF DESCRIPTION OF THE DRAWINGS

Figure 1:
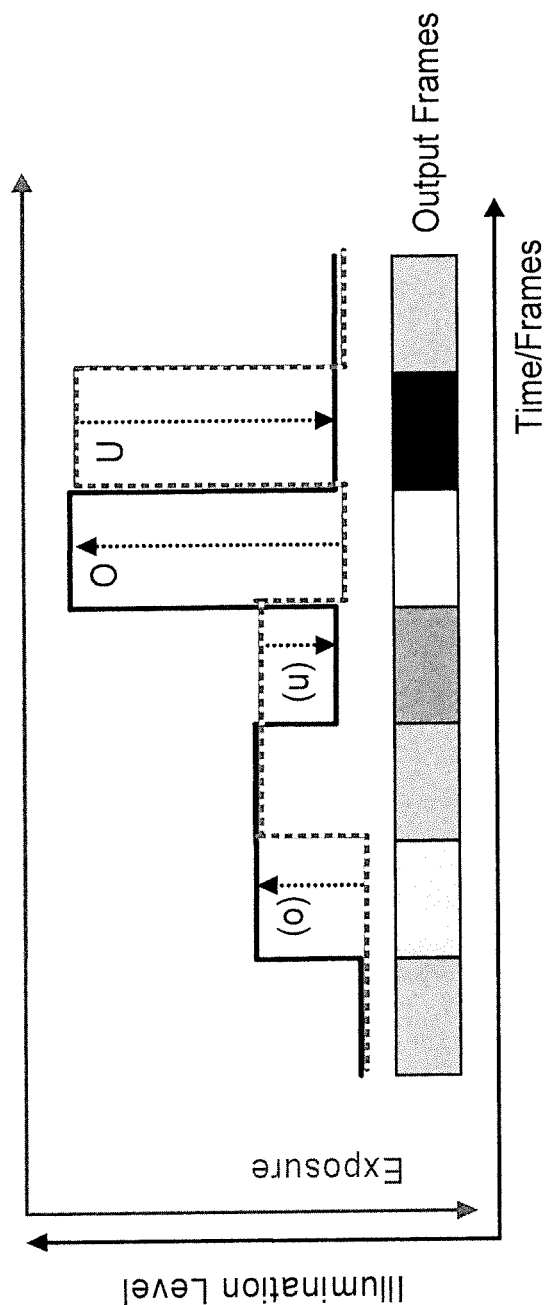
Figure 2:
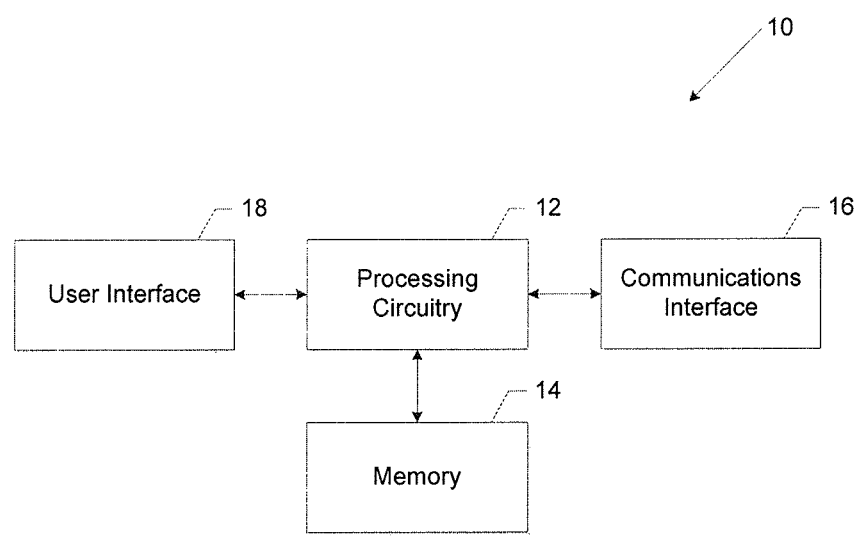
Figure 3:
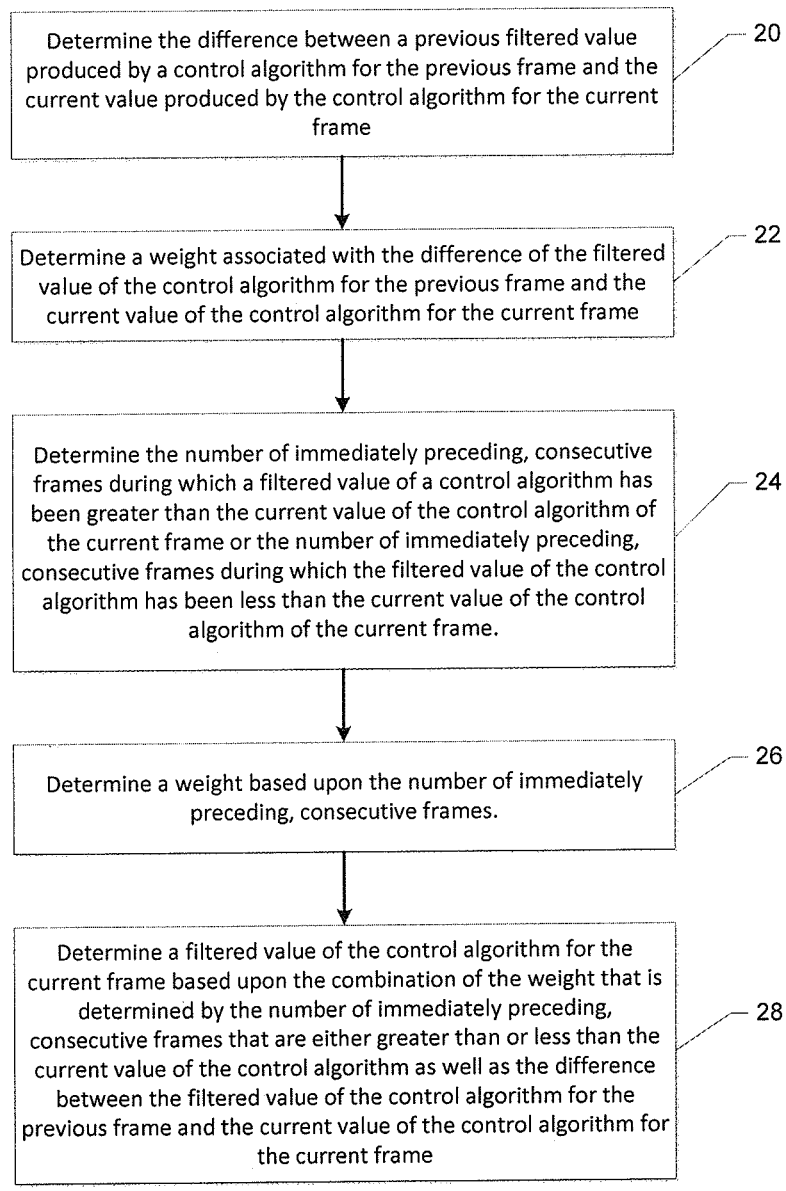
Figure 4:
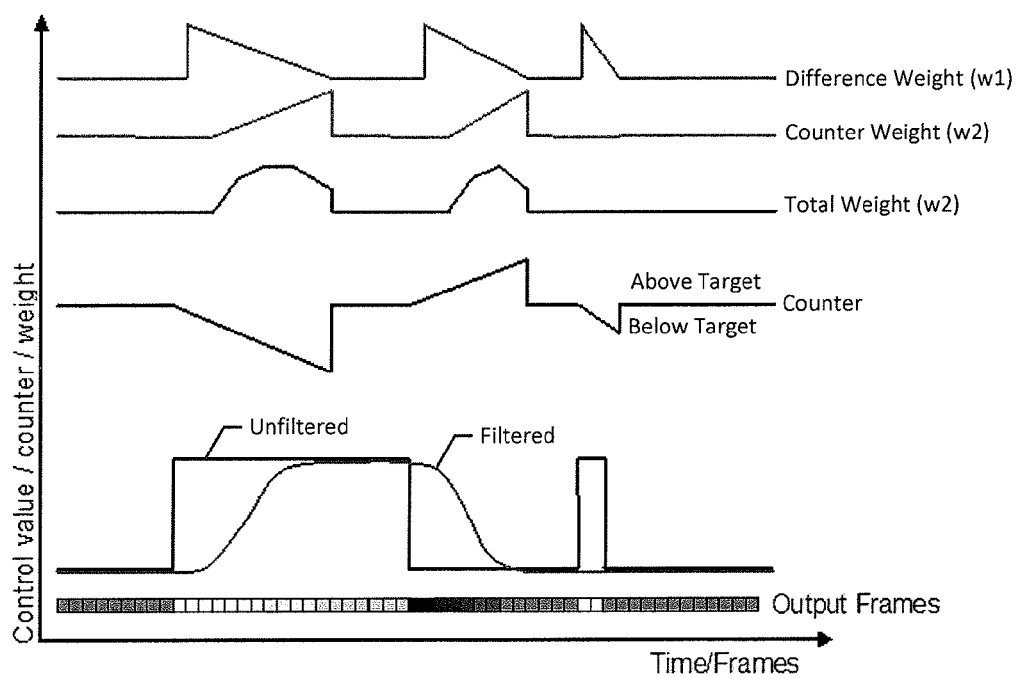
Figure 5:
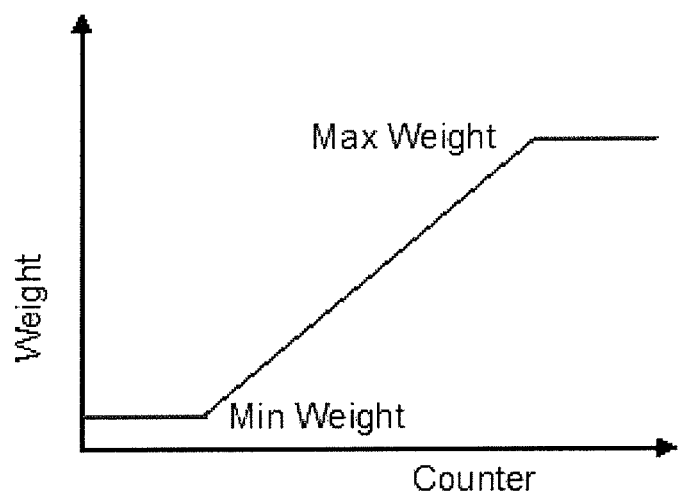
Figure 6:
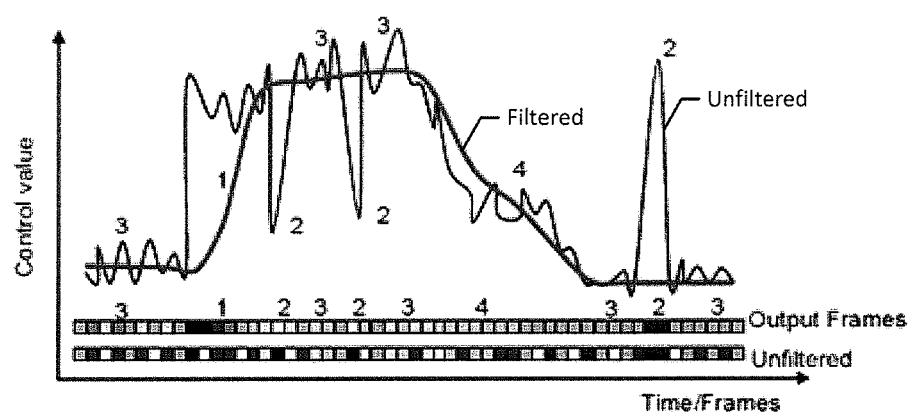
Figure 7:
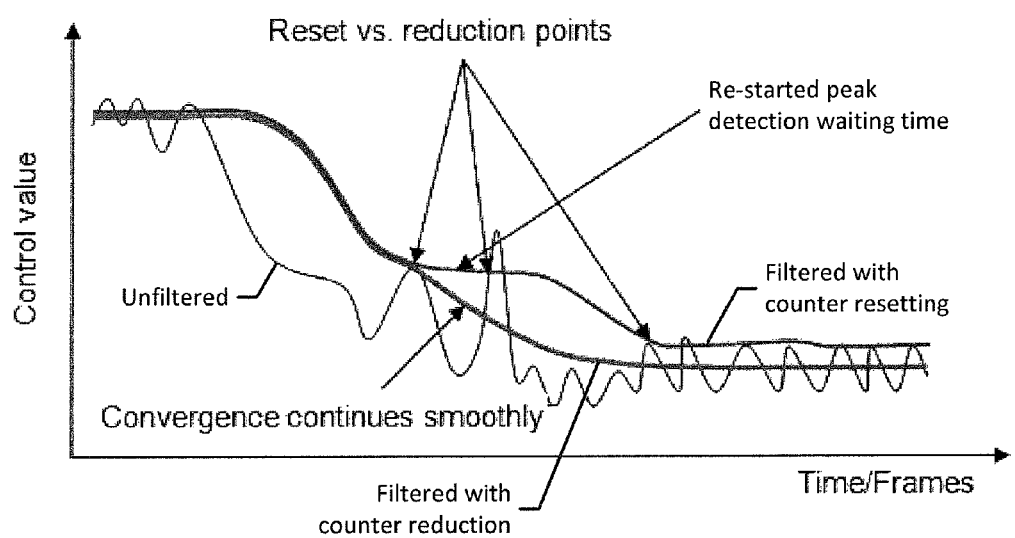

Having thus described certain example embodiments of the present disclosure in general terms, reference will now be made to the accompanying drawings, which are not necessarily drawn to scale, and wherein:

FIG. 1 is a graphical representation of the illumination level of a plurality of frames and the exposure levels suggested for the frames by an AEC algorithm;

FIG. 2 is a block diagram of an apparatus that may be specifically configured in accordance with an example embodiment of the present invention;

FIG. 3 is a flowchart illustrating operations performed, such as by the apparatus of FIG. 2, in accordance with an example embodiment of the present invention;

FIG. 4 is a graphical representation of the weights assigned to a difference between the filtered value and the current value of a control algorithm and the corresponding counter values as well as representations of both the unfiltered and filtered values of a control algorithm responsive to a plurality of streaming frames in accordance with an example embodiment of the present invention;

FIG. 5 is a graphical representation of a counter-based weight generation function in accordance with an example embodiment of the present invention;

FIG. 6 is a graphical representation of unfiltered and filtered values of a control algorithm in accordance with an example embodiment of the present invention; and FIG. 7 is a graphical representation of a more smoothly converged filtered control value as determined in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention in order to provide improved temporal stabilization for streaming frames, such as streaming frames of video. As such, the method, apparatus and computer program product may be embodied by any of a variety of computing devices that are configured to receive and to present streaming frames, such as streaming video. For example, the computing devices may include any of a variety of mobile terminals, such as a portable digital assistant (PDA), mobile telephone, smartphone, pager, mobile television, gaming device, laptop computer, camera, tablet computer, touch surface, video recorder, audio/video player, radio, electronic book, positioning device (e.g., global positioning system (GPS) device), or any combination of the aforementioned, and other types of voice and text communications systems. Additionally or alternatively, the computing device may include fixed computing devices, such as a personal computer, a computer workstation or the like. Still further, the method, apparatus and computer program product of an example embodiment may be embodied by a network device, such as a server or other network entity, configured to provide temporal stabilization of streaming frames for one or more computing devices, such as one or more client devices.

Regardless of the type of computing device, an apparatus 10 that may be specifically configured to provide temporal stabilization of streaming frames in accordance with an example embodiment of the present invention is illustrated in FIG. 2. It should also be noted that while FIG. 2 illustrates one example of a configuration of an apparatus for providing temporal stabilization of streaming frames, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 2, the apparatus 10 may include or otherwise be in communication with a processor 12, a memory device 14 and optionally a communication interface 16 and a user interface 18. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 10 may be embodied by a computing device, such as a mobile terminal. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 16 may be any means such as a device or circuitry embodied in either hardware or a combination of hardware and software that is configured to receive and/or transmit data from/to a network and/or any other device or module in communication with the apparatus 10. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms In some embodiments, the apparatus 10 may include a user interface 18 that may, in turn, be in communication with the processor 12 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

Referring now to FIG. 3, the operations performed in order to provide temporal stabilization of the output provided by a control algorithm, such as the AEC algorithm, the AWB algorithm, a contrast optimization algorithm or the like, are illustrated. As shown in block 20 of FIG. 3, the apparatus 10 may include means, such as the processor 12, for determining the difference between a previous filtered value produced by the respective control algorithm for the previous frame and the current value produced by the control algorithm in response to the current frame. In this regard, the apparatus, such as the processor, may be configured, depending upon the type of control algorithm, to determine the difference as the ratio of the current value of the control algorithm for the current frame to the previous filtered value of the control algorithm for the previous frame, as the difference between the current value of the control algorithm for the current frame and the previous filtered value of the control algorithm for the previous frame, as the sum of differences in an instance in which multiple values are evaluated or the like.

As shown in block 22 of FIG. 3, the apparatus 10 may also include means, such as the processor 12, for determining a weight associated with the difference of the filtered value of the control algorithm for the previous frame and the current value of the control algorithm for the current frame as described by U.S. Pat. No. 6,148,103, the contents of which are incorporated in their entirety herein. The apparatus, such as the processor, may determine the weight so as to be dependent upon the difference between the previous filtered value of the control algorithm for the previous frame and the current value of the control algorithm for the current frame. In one embodiment, the weight has a direct relationship to the difference between the previous filtered value of the control algorithm for the previous frame and the current value of the control algorithm for the current frame, such as the product of a predefined positive value and the difference between the previous filtered value of the control algorithm for the previous frame and the current value of the control algorithm for the current frame. As such, the apparatus, such as the processor, may assign a greater weight in an instance in which the difference between the previous filtered value of the control algorithm for the previous frame and the current value of the control algorithm for the current frame is larger and a smaller weight in an instance in which the difference between the previous filtered value of the control algorithm for the previous frame and the current value of the control algorithm for the current frame is smaller.

As shown in block 24 of FIG. 3, the apparatus 10 of an example embodiment of the present invention may also include means, such as the processor 12, for determining the number of immediately preceding, consecutive frames during which a filtered value of a control algorithm has been greater than the current value of the control algorithm of the current frame. Similarly, the apparatus may include means, such as the processor, for determining the number of immediately preceding, consecutive frames during which the filtered value of the control algorithm has been less than the current value of the control algorithm of the current frame. The apparatus of this embodiment also includes means, such as the processor, for determining a weight based upon the number of immediately preceding, consecutive frames. See block 26 of FIG. 3.

In this regard, the weight varies in a direct relationship to the number of immediately preceding, consecutive frames, such as the product of a predefined positive value and the number of immediately preceding, consecutive frames. As such, the apparatus, such as the processor, may assign a greater weight in an instance in which the number of immediately preceding, consecutive frames is larger and a smaller weight in an instance in which the number of immediately preceding, consecutive frames is smaller. By assigning a weight in a manner that has a direct relationship to the number of immediately preceding, consecutive frames, the impact of short outlier peaks in the output of a control algorithm is reduced. Additionally, the direct relationship between the weight and the number of immediately preceding, consecutive frames provides for the convergence to be increased in an instance in which the number of immediately preceding, consecutive values is greater, while still maintaining a relatively smooth convergence.

In order to determine the number of immediately preceding, consecutive frames, the apparatus 10 of one embodiment may include means, such as the processor 12, the memory 14 or the like, for maintaining a first counter of the number of immediately preceding, consecutive frames during which the filtered value of the control algorithm has been greater than the current value of the control algorithm for the current frame. The apparatus may also include means, such as the processor, the memory or the like, for maintaining a second counter of the number of immediately preceding, consecutive frames during which the filtered value has been less than the current value of the control algorithm for the current frame. Thus, the apparatus, such as the processor, may determine the weight based upon the value of either the first counter or the second counter, such as the counter having a non-zero value, with the weight having a direct relationship to the value of the respective counter. For example, the weight may be defined as the product of a predefined positive value and the value of the counter having a non-zero value, such as the first counter in an instance in which the current value of the control algorithm for the current frame is less than the filtered value of the control algorithm for the immediately preceding frame and the second counter in an instance in which the current value of the control algorithm for the current frame is greater than the filtered value of the control algorithm for the immediately preceding frame. In this regard, a greater weight may be assigned in an instance in which the counter with a non-zero value has a larger value and a smaller weight in an instance in which the counter with a non-zero value has a smaller value. By assigning a lower weight in an instance in which the counter value is smaller, the apparatus, such as the processor, may not respond in an excessive manner to changes in the current value of the control algorithm that may be due to outlier peaks as opposed to more meaningful substantive changes in the frames.

As shown in block 28 of FIG. 3, the apparatus 10 may also include means, such as the processor 12, for determining a filtered value of the control algorithm for the current frame based upon the combination of the weight that is determined by the number of immediately preceding, consecutive frames that are either greater than or less than the current value of the control algorithm as well as the weight that is determined by the difference between the filtered value of the control algorithm for the previous frame and the current value of the control algorithm for the current frame. As such, the method, apparatus and computer program product of this embodiment determines a filtered value of the control algorithm for the current value that is based not only upon a weighted difference between the filtered value of the control algorithm for a prior frame and the control value of the control algorithm for the current frame, but also a weighted number of frames for which the filtered values of the control algorithm have been either greater or less than the current value of the control algorithm for the current frame, thereby improving the responsiveness and convergence of the filtered values.

In one embodiment, the apparatus 10 may also include means, such as the processor 12, the memory 14 or the like, for resetting at least one of the first and second counters in an instance in which the magnitude of the filtered value of the control algorithm for the previous frame equals or exceeds the magnitude of the current value of the control algorithm for the current frame. In this embodiment, the apparatus, such as the processor, may reset the first or second counter in an instance in which the magnitude, e.g., the absolute value, of the filtered value of the control algorithm equals or exceeds the magnitude, e.g., the absolute value, of the current value of the control algorithm of the current frame. For example, the first counter may be reset in an instance in which the current value of the control algorithm of the current frame equals or exceeds the filtered value of the control algorithm for the previous frame. Similarly, the second counter may be reset in an instance in which the current value of the control algorithm of the current frame equals or is less than the filtered value of the control algorithm for the previous frame. In one embodiment, the apparatus, such as the processor, the memory device or the like, may reset the first and second counters to zero.

By way of example, reference is now made to FIG. 4 which illustrates a plurality of frames having different illumination levels, as represented by different grayscale levels over the course of time. FIG. 4 also illustrates the unfiltered values provided by a control algorithm in response to the frames. As shown, the unfiltered values of the control algorithm change dramatically upon a sharp change in illumination level of the frames, even in an instance in which the sharp change in the illumination level of the frames is relatively brief. FIG. 4 also depicts the value of the first and second counters (such as a sum of the first and second counters) and indicates instances in which the second counter maintains a count of the number of immediately preceding, consecutive frames in which the filtered value is of the control algorithm is less than the current value as being "below target" and instances in which the first counter maintains a count of the number of immediately preceding, consecutive frames in which the filtered value of the control algorithm exceeds the current value of the control algorithm for the current frame as being "above target." As shown, the counter value incrementally increases in magnitude until such time that the magnitude of the filtered value of the control algorithm for the prior frame equals or exceeds the current value of the control algorithm for the current frame, at which time the counter is reset to zero.

FIG. 4 also illustrates the weight w1 that is determined for the difference between the prior filtered value of the control algorithm for the prior frame and the current value of the control algorithm for the current frame and the weight w2 that is determined based upon the counter, as well as the combination of the weights designated Total Weight, such as the addition of the weights. By applying the combination of the weights, a filtered value of the current frame may be determined, such as shown in FIG. 4. In this regard, the filtered value is a smoother representation that converges to the same value.

As noted above, the apparatus 10, such as the processor 12, may determine the filtered value of the current frame based upon a combination of the weight w1 that is based upon the number of immediately preceding, consecutive frames that are either greater than or less than the current value of the control algorithm as well as the weight w2 that is based upon the difference between the prior filtered value of the control algorithm for the previous frame and the current value of the control algorithm for the current frame. For example, the apparatus, such as the processor, may determine the filtered value of the current frame to be based upon the product of the two weights, to be based upon the minimum of the two weights, to be based upon a product of one of the weights, such as weight w2, and the current value of the control algorithm for the current frame in an instance in which weight w1 exceeds a predefined threshold and, in an instance in which weight w1 does not exceed the predefined threshold, to base the weight upon a product of the two weights. In the foregoing embodiments, the magnitudes of the weights as well as the thresholds are tunable, such as by the user, such that the strength of the outlier or peak filtering and the speed of convergence following changes in the illumination level of the frames are correspondingly tunable. Once combined, the filtered value of the current frame may be determined based upon the combination of the weights and the current value of the control algorithm for the current frame, such as by determining the product of the combination of the weights and the current value of the control algorithm for the current frame.

By way of another example in which a plurality of weights are combined, the apparatus 10, such as the processor 12, may determine a common weight wc for the plurality of weights w1, w2, w3, etc. and thereafter utilize the common weight in the determination of the filtered value of the current frame. As such, the processor may implement a function to determine the common weight wc as follows: wc=f(w1, w2, w3, ... ) with f being the function that defines the manner in which the individual weights are combined. While a common weight wc may be defined in various manners, the processor of an example embodiment may define the common weight wc of n individual weights as follows: wc=(weightSum+minWeight−maxWeight)/n with weightSum being the sum of the individual weights, minWeight being the minimum value of the individual weights and maxWeight being the maximum value of the individual weights. In this example, the addition of the minimum value of the individual weights increases the effect of the smallest weight and the subtraction of the maximum value of the individual weights decreases the effect of the largest weight.

In an example embodiment, the plurality of weights to be combined may be based on a plurality of different control signals. For example, control values may adjust the contrast of an image by changing midtones, shadows, highlights, etc. with each parameter being responsive to an individual control signal. In order for the control values to change with the same speed, a weight may be determined based on each unfiltered control signal, thereby resulting in a plurality of different weights. The weights may then be combined with the common weight then being utilized to filter all of the control signals individually.

By way of another example, the weight associated with the value of a counter in accordance with one embodiment of the present invention may be defined as shown in FIG. 5 in which the weight varies linearly with the value of the counter between a minimum weight and a maximum weight. However, the apparatus 10, such as the processor 12, may define the relationship between the weight and the value of the counter in other manners in other embodiments.

As shown in FIG. 6, the method, apparatus and computer program product of an example embodiment may provide a smoother filtered output of a control algorithm that may converge to the appropriate value, but may be less responsive to short-lived outlier peaks. In this regard, the illumination levels of the frame include a plurality of outlier peaks as shown by the unfiltered output of a control algorithm. Following processing of the unfiltered output of the control algorithm, the filtered value of the control algorithm provided in accordance with one embodiment to the method, apparatus and computer program product of the present invention provides a much smoother, while still very representative output that will result in an improved user experience and increase temporal stabilization of the streaming frames.

In order to take into account and to smoothly follow an ascending or descending trend of the value of the control algorithm, the method, apparatus and computer program product of one embodiment need not reset the counter value to zero in an instance in which the magnitude of the filtered value of the control algorithm for the previous frame equals or exceeds the magnitude of the current value of the control algorithm for the current frame as described above. Instead, the method, apparatus and computer program product may reduce, but not reset, the value of the counter in response to the magnitude of the filtered value of the control algorithm for a previous frame equaling or exceeding the magnitude of the current value of the control algorithm for the current frame. For example, the unfiltered values generated by the control algorithm for a plurality of frames may have a descending or ascending trend, such as a descending trend as shown in FIG. 7, with some temporal variations in the descending or ascending trend. In an instance in which the counter would be reset in each instance in which the magnitude of the filtered value of the control algorithm for the previous frame equaled or exceeded the current value of the control algorithm for the current frame, the peak detection waiting time would be restarted and the convergence would not be as smooth as may be desired as shown by the "Filtered with counter resetting" line in FIG. 7. Indeed, in this instance, the counters would have been reset at each of the points that are illustrated in FIG. 7 based upon the magnitude of the filtered value of the control algorithm for a previous frame equaling or exceeding the current value of the control algorithm for the current frame which changes the convergence of the filtered value of the control algorithm and may be perceived by the user as an error or other glitch. Instead, the method, apparatus and computer program product of this embodiment may reduce, but not reset, the value of the counter in an instance in which the magnitude of the filtered value of the control algorithm for the previous frame equals or exceeds the current value of the control algorithm for the current frame.

Thus, the apparatus 10 may include means, such as the processor 12, for reducing at least one of the first and second counters, such as the respective counter which has a non-zero value, in an instance in which the magnitude of the filtered value of the control algorithm for the previous frame equals or exceeds the magnitude of the current value of the control algorithm of the current frame. More particularly, the apparatus of one embodiment may include means, such as the processor, for determining that the immediately preceding, consecutive frames are ascending or for determining that the immediately preceding, consecutive frames are descending, as determined in terms of the ascending or descending nature of the filtered value of the control algorithm for the prior frame. In an instance in which the immediately preceding, consecutive frames are determined to be ascending or to be descending, the apparatus, such as the processor, may reduce at least one of the first and second counters, that is, the one of the first and second counters that has a non-zero value, without resetting the respective counter to zero. By reducing, but not resetting the respective counter, the filtered value of the control algorithm may converge in a more consistent and smooth manner as shown by the "Filtered with counter reduction" curve in FIG. 7, thereby resulting in an improved user experience. In this embodiment, the extent to which the counter value is reduced may be tunable, such as by the user, in order to further improve the user experience.

In one embodiment, the method, apparatus and computer program product may employ different weights, thresholds or the like in instances in which the filtered value of the control algorithm is increasing than in instances in which the filtered value of the control algorithm is decreasing. As such, the method, apparatus and computer program product of an example embodiment may respond differently to overexposure and to underexposure, such as by responding to overexposure more quickly than to underexposure.

As described above, FIG. 3 illustrates a flowchart of an apparatus 10, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by a processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method comprising:
   determining, with a processor, a number of preceding, consecutive frames during which a an associated filtered value has been greater than a current value of a current frame or the number of preceding, consecutive frames during which the associated filtered value has been less than the current value of the current frame, wherein determining the number of preceding, consecutive frames comprises maintaining a first counter of the number of preceding, consecutive frames during which the associated filtered value has been greater than the current value of the current frame or maintaining a second counter of the number of preceding, consecutive frames during which the associated filtered value has been less than the current value of the current frame;
   determining a weight based upon the number of preceding, consecutive frames, wherein the weight varies in a direct relationship to the number of preceding, consecutive frames;
   determining a filtered value of the current frame based upon a combination of the weight and a difference between a prior filtered value associated with a previous frame and the current value of the current frame; and
   resetting at least one of the first and second counters in an instance in which the filtered value associated with the proceeding, consecutive frames equals or exceeds the current value of the current frame.

2. A method according to claim 1 further comprising reducing at least one of the first and second counters in an instance in which the filtered value associated with the proceeding, consecutive frames equals or exceeds the current value of the current frame.

3. A method according to claim 2 further comprising determining that the preceding, consecutive frames are ascending or determining that the preceding, consecutive frames are descending, wherein reducing at least one of the first and second counters comprises reducing, but not resetting, at least one of the first and second counters in an instance in which the preceding, consecutive frames are determined to be ascending or to be descending.

4. A method according to claim 1 further comprising determining a weight associated with the difference between the prior filtered value and the current value of the current frame, and wherein determining the filtered value of the current frame comprises determining the filtered value of the current frame based upon a combination of the plurality of weights and the current value of the current frame.

5. A method according to claim 4 further comprising combining the weight associated with the difference between the prior filtered value and the current value of the current frame and the weight based upon the number of preceding, consecutive frames.

6. A method according to claim 1, where in the number of preceding consecutive frames comprises a number of immediately preceding, consecutive frames.

7. An apparatus comprising at least one processor and at least one memory including computer program code, the at least one memory and the computer program code configured to, with the processor, cause the apparatus to at least:

determine a number of preceding, consecutive frames during which an associated filtered value has been greater than a current value of a current frame or the number of preceding, consecutive frames during which the associated filtered value has been less than the current value of the current frame, wherein the at least one memory and the computer program code are configured to, with the processor, cause the apparatus to determine the number of preceding, consecutive frames by maintaining a first counter of the number of preceding, consecutive frames during which the associated filtered value has been greater than the current value of the current frame or by maintaining a second counter of the number of preceding, consecutive frames during which the associated filtered value has been less than the current value of the current frame;

determine a weight based upon the number of preceding, consecutive frames, wherein the weight varies in a direct relationship to the number of preceding, consecutive frames;

determine a filtered value of the current frame based upon a combination of the weight and a difference between a prior filtered value associated with a previous frame and the current value of the current frame; and reset at least one of the first and second counters in an instance in which the filtered value associated with the proceeding, consecutive frames equals or exceeds the current value of the current frame.

8. An apparatus according to claim 7 wherein the at least one memory and the computer program code are further configured to, with the processor, cause the apparatus to reduce at least one of the first and second counters in an instance in which the filtered value associated with the proceeding, consecutive frames equals or exceeds the current value of the current frame.

9. An apparatus according to claim 8 wherein the at least one memory and the computer program code are further configured to, with the processor, cause the apparatus to determine that the preceding, consecutive frames are ascending or to determine that the preceding, consecutive frames are descending, wherein the at least one memory and the computer program code are configured to, with the processor, cause the apparatus to reduce at least one of the first and second counters by reducing, but not resetting, at least one of the first and second counters in an instance in which the preceding, consecutive frames are determined to be ascending or to be descending.

10. An apparatus according to claim 7 wherein the at least one memory and the computer program code are further configured to, with the processor, cause the apparatus to determine a weight associated with the difference between the prior filtered value and the current value of the current frame, and wherein the at least one memory and the computer program code are configured to, with the processor, cause the apparatus to determine the filtered value of the current frame by determining the filtered value of the current frame based upon a combination of the plurality of weights and the current value of the current frame.

11. An apparatus according to claim 7 wherein the at least one memory and the computer program code are further configured to, with the processor, cause the apparatus to combine the weight associated with the difference between the prior filtered value and the current value of the current frame and the weight based upon the number of preceding, consecutive frames.

12. A computer program product comprising at least one non-transitory computer-readable storage medium having computer-executable program code portions stored therein, the computer-executable program code portions comprising program code instructions for:

determining a number of preceding, consecutive frames during which an associated filtered value has been greater than a current value of a current frame or the number of preceding, consecutive frames during which the associated filtered value has been less than the current value of the current frame, wherein the program code instructions for determining the number of preceding, consecutive frames comprise program code instructions for maintaining a first counter of the number of preceding, consecutive frames during which the associated filtered value has been greater than the current value of the current frame or program code instructions for maintaining a second counter of the number of preceding, consecutive frames during which the associated filtered value has been less than the current value of the current frame;

determining a weight based upon the number of preceding, consecutive frames, wherein the weight varies in a direct relationship to the number of preceding, consecutive frames;

determining a filtered value of the current frame based upon a combination of the weight and a difference between a prior filtered value associated with a previous frame and the current value of the current frame; and resetting at least one of the first and second counters in an instance in which the filtered value associated with the proceeding, consecutive frames equals or exceeds the current value of the current frame.

13. A computer program product according to claim 12 wherein the computer-executable program code portions further comprise program code instructions for reducing at least one of the first and second counters in an instance in which the filtered value associated with the proceeding, consecutive frames equals or exceeds the current value of the current frame.

14. A computer program product according to claim 13 wherein the computer-executable program code portions further comprise program code instructions for determining that the preceding, consecutive frames are ascending or program code instructions for determining that the preceding, consecutive frames are descending, wherein the program code instructions for reducing at least one of the first and second counters comprise program code instructions for reducing, but not resetting, at least one of the first and second counters in an instance in which the preceding, consecutive frames are determined to be ascending or to be descending.

15. A computer program product according to claim 12 wherein the computer-executable program code portions further comprise program code instructions for determining a weight associated with the difference between the prior filtered value and the current value of the current frame, and wherein program code instructions for determining the filtered value of the current frame comprise program code instructions for determining the filtered value of the current frame based upon a combination of the plurality of weights and the current value of the current frame.

\* \* \* \* \*